No. 668,643. Patented Feb. 26, 1901.
T. H. HICKS.
AMALGAMATOR.
(Application filed June 14, 1899.)
(No Model.)
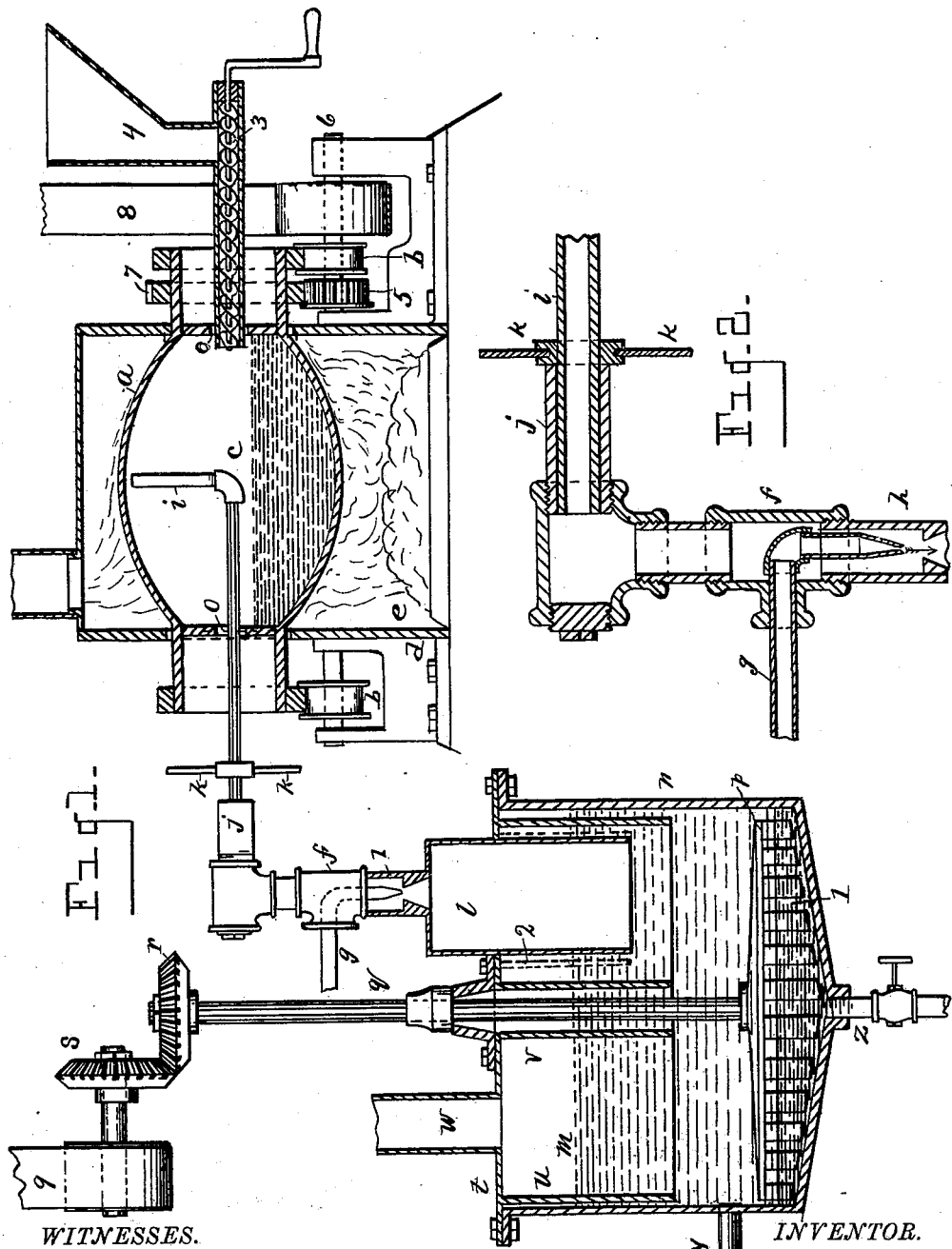
WITNESSES.
O. B. Baeuziger.
M. Hickey.
INVENTOR.
Thomas H. Hicks
By Newell S. Wright
His Attorney

UNITED STATES PATENT OFFICE.

THOMAS H. HICKS, OF FORT WAYNE, INDIANA.

AMALGAMATOR.

SPECIFICATION forming part of Letters Patent No. 668,643, dated February 26, 1901.

Application filed June 14, 1899. Serial No. 720,504. (No model.)

*To all whom it may concern:*

Be it known that I, THOMAS H. HICKS, a subject of the Queen of Great Britain, residing at Fort Wayne, county of Allen, State of Indiana, have invented certain new and useful Improvements in Amalgamators; and I declare the following to be a full, clear, and exact description of the invention, such as will enable others skilled in the art to which it appertains to make and use the same, reference being had to the accompanying drawings, which form a part of this specification.

This invention relates to new and useful improvements in an amalgamator for recovering amalgamable metals from their ores, such as gold, silver, copper, &c.

The purpose of my invention is to provide mechanism to recover amalgamable metals from their ores by the process of amalgamation with mercury. To carry out my scheme successfully, I employ a novel construction and arrangement of devices by which even the most rebellious ores can have their metallic portions cleaned and combined with mercury so as to render the valuable properties of the ores easily recoverable and without expensive loss of the mercury. To this end one part of my scheme refers to means for subjecting ores to the action of the vapor of mercury, and a second part refers to means for preventing loss of mercury and collecting and delivering the ore after having been treated by mercury in a suitable condition for collection of the values contained in the ore by a subsequent treatment over a body of mercury.

My invention is fully described in the following specification and illustrated in the drawings submitted herewith, in which—

Figure 1 is a view, mostly in vertical section, showing parts in elevation. Fig. 2 is a detail view of certain parts in section.

I have omitted showing certain parts in detail which are not essential elements of my invention, but which will be readily understood. Fig. 1 of the drawings is therefore partly diagrammatic.

The various parts shown in the drawings are lettered as follows:

$a$ is a rotatable retort, beneath which are wheel or roller bearings $b$, upon which the retort is intended to rotate. A body of pulverized ore $c$ is shown within the retort, the ore being mixed with a suitable quantity of mercury.

$d$ is a furnace, and $e$ is its combustion-chamber, over which the retort $a$ rotates.

A steam-suction-exhaust apparatus is indicated at $f$, supplied with steam through a pipe $g$, leading from any suitable source of steam-supply. The steam-suction-exhaust apparatus is provided with a pipe $h$, forming a part thereof. This exhauster or exhaust apparatus may be of any ordinary construction.

$i$ and $j$ unitedly form a suction-pipe operated by the exhauster $f$. The pipe $i$ is made to slip into the pipe $j$ and to have a partial rotation therein, as required, by means of the handles $k$, when the ore requires to be drawn from the retort after having been sufficiently treated therein.

A condensing pipe or cylinder is employed, (shown at $l$,) having its lower end dipped under water, which is indicated by the dotted line at $m$, within a tank $n$, which may be filled with water to the line $m$. An agitator $p$ is made to rotate in the tank $n$. A shaft $q$ is attached to the agitator to cause rotation, as by the gears $r$ $s$, arranged to actuate said shaft. The tank is provided with a cast-iron cover $t$, preferably having a projecting annular lip $u$, said lip made deep enough to dip well under the water within the tank. The cover is also provided with a central hollow casting $v$, attached to the cover, and forms a tube through which the shaft $q$ passes. The two parts $u$ and $v$ are only for the purpose of making an air-tight cover, the water sealing it securely, the lip $u$ and the tube $v$ extending below the water-line. An outlet-pipe $w$ is attached to the cover $t$ for the escape of air which is taken in by the steam-suction-exhaust apparatus. A steam-pipe $y$ is employed for heating the water contained in the tank $n$ when required during treatment of the ore. The tank $n$ is provided with a pipe $z$, having a suitable cock for drawing off ore-pulp and mercury from the tank. The tank $n$ is suitably supplied with mercury, (indicated at 1,) over which the ore is to be treated in collecting all of its amalgamable metals.

Having thus referred to the various parts of the mechanism shown in the drawings, I will now describe the *modus operandi* of treating the ore thereby.

The ore after having been suitably pulverized is put into the retort *a*. A suitable quantity of metallic mercury is then to be put into the ore. The retort is then caused to be rotated slowly over the fire in the combustion-chamber until the ore becomes heated to about 500° Fahrenheit. It will be found by suitable tests that when the ore and mercury are heated together in this manner, not above 500° heat, every particle of amalgamable metals will have become coated with a film of mercury; but if the heat be carried much above that point the mercury will all be driven off, and if silver and sulfur be present the former will be attacked by the latter, so as to prevent its recovery in the treating-tank *n*, owing to the particles of silver becoming tarnished by the sulfur. Gold particles, however, will not become tarnished after having once become cleaned by the mercury by amalgamation therewith, even if the ore should be heated to a cherry red, as hot sulfur cannot attack gold. Care is therefore necessary to avoid heating the ore too hot on account of any silver which might be present. When the ore becomes heated above 250°, some mercury-vapor will begin to rise and if not prevented would escape through the end openings *o o* of the retort, which would result in expensive loss. Therefore to prevent such loss I arrange the pipe *i* with the opening at its extremity directed upward and turn on a little steam through the exhauster *f* just sufficient to create a suction in pipe *i* sufficient to cause the rising mercury-vapor, together with a little air entering the holes *o o*, to be sucked through the pipe *i* and then forced through the water in the tank *n*, and thereby be saved. The retort *a* is preferably constructed so as to be larger in the center than at the extremities for the purpose of causing the ore to move toward the center of the retort during rotation. When the ore has been sufficiently acted upon by the mercury, the pipe *i* is then turned so that its open end will be in the ore, and the suction is then to be increased through the exhauster strong enough to suck the ore and its contained mercury through the pipe *i* and into the water of the tank *n*. The air which has been taken in with the ore will escape through the water and out of the pipe *w*. When sucking the ore out of the retort, the open end of pipe *i* is to be gradually turned, so as to be kept in the ore during the rotation of the retort, and the rotation and shape of the retort will cause nearly all of the ore to roll to the center, from whence it will be sucked through the pipe *i*. It will thus be understood that the shape of the retort forms an important feature of my invention, inasmuch as I am thereby permitted to remove all of the ore from the retort by the use of only one pipe. The pipe *i*, it will be noticed, serves two purposes, one being when its mouth is directed upward to draw off rising mercury-vapor from the retort and the other being when its mouth is directed downward to convey the treated ore to the treating-tank *n*. These two essential uses of the pipe *i* can most readily be carried out by arranging the pipe so as to be rotatable in the pipe *j*, and therefore this feature forms another important part of my invention. The rotation and shape of the retort also cause the ore to become well mixed with the mercury and evenly heated all through the body of ore. The pipe *l* is preferably made much larger than the pipe *h*, which is also an important feature in the construction thereof, inasmuch as the increased size of the pipe *l* allows the speed of the ore and mercury passing therethrough to be much slower before entering the water in their heated state, thereby preventing too-sudden formation of steam when they enter the water. This cylinder *l* may advantageously be not less than thirty inches in diameter and twelve feet long. The agitator *p* is to be kept in constant motion when ore is being drawn from the retort thereinto, so as to prevent the ore from settling too firmly in the bottom of the tank and also to equalize the heat through the water and more quickly condense the ore and mercury. This tank *n* may advantageously be not less than eight feet in diameter and five feet deep, so as to contain enough water to cool at least one to two tons of ore at a time. The agitation is also essentially useful when the ore-pulp is to be conveyed to other tanks for further treatment, and the thickness of the ore-pulp can also be controlled by the speed of the agitator. The faster it rotates, of course, the less ore will remain in the lower part of the tank, inasmuch as the agitator-blades are to be short and operate only in the bottom of the tank. If the ore is to be finally treated in the tank *n*, steam is then to be turned on through the pipe *y* until the ore-pulp has become heated sufficiently, and the agitation will then cause all the amalgamated particles of gold and silver to become collected in the body of mercury 1, and the ore-gangue can then be drawn off through the pipe *z* and conveyed through suitable concentrators for the recovery of any floating particles of mercury.

Instead of sinking the pipe *l* down into the water the cover *t* might be provided with suitable depending walls, (indicated in dotted lines at 2,) so as to accomplish the desired results. The drawings serve to show that I intend to collect and condense heated ore and mercury-vapor by forcing them through water. This part of my invention is very essential, inasmuch as I can thereby draw off hot ore and mercury-vapor without requiring to cool off the retort, which would occasion extra loss of fuel and also liability to crack the retort by change of temperature. The heat of the ore also serves to heat the water in the tank, which is essential for treatment over the body of mercury 1.

The retort a may be filled in any suitable manner, as by a conveyer, (indicated at 3,) to which a suitable hopper 4 discharges, the conveyer leading into the retort, as shown. The retort may be rotated in any suitable manner, as by a pinion 5 upon a shaft 6, meshing with a gear 7 upon the retort. The shaft 6 may be belted, as by a belt 8, to any suitable source of power. So, also, the shaft of the gear s may be belted by a belt 9 to any suitable source of power to drive the agitator p. I would have it understood, however, that I do not limit myself to any special means of feeding the ore to the retort or to any particular mechanism for rotating the retort and the agitator.

Having thus described my invention, what I claim as new, and desire to secure by Letters Patent, is—

1. In an apparatus for mercurializing ores, the combination of a rotatable retort to contain pulverized ore and mercury, means for heating the mixed ore and mercury in said retort, and a partially-rotatable pipe arranged within said retort for drawing off rising mercury-vapor from said retort and for emptying said retort, substantially as set forth.

2. In an apparatus for mercurializing ores, the combination of a rotatable retort to contain pulverized ore and mercury, means for heating the mixed ore and mercury in said retort, a partially-rotatable pipe arranged within said retort for drawing off mercury-vapor and the ore contents in said retort, a tank containing water connected by suitable piping to said partially-rotatable pipe arranged within said retort, and means for drawing off the mercury and ore contents of said retort and collecting them by the water contained in said tank, substantially as set forth.

3. In an apparatus for mercurializing ores, the combination of a rotatable retort to contain ore and mercury and provided with suitable means for heating said ore and mercury together in said retort to vaporize the mercury, of an adjustable pipe arranged within said retort and adapted for carrying mercury-vapor and ore out of said retort during treatment of ore in said retort, a suction device applied to said adjustable pipe, a condensing-tank containing water, and an expanded condensing-pipe connecting said suction device with said condensing-tank, said condensing-pipe being constructed and arranged to cause the ore and mercury to slow down in speed before being forced into the water of said condensing-tank, substantially as described.

4. In an apparatus for mercurializing ores, the combination of a rotatable retort to contain ore and mercury, and provided with means for heating said retort to vaporize said mercury, an adjustable pipe arranged within said retort, and a suction device attached to said adjustable pipe, the open end of said adjustable pipe adapted to be normally directed upward within the retort and out of the ore while the ore is being treated so as to draw off and save rising mercury-vapor and adapted to be directed downward and into the ore after the ore has been treated, so as to draw the ore, by suction, out of the retort, substantially as described.

5. In an apparatus for mercurializing ore, the combination of a retort to contain ore and mercury, means for vaporizing said mercury, an adjustable pipe extending into said retort for the purpose of emptying the retort of its contents, said retort provided with an opening for the admission of air, suction mechanism connected to said adjustable pipe, for emptying the retort of its mercury and ore, and a water-condensing tank for collecting said mercury and ore, said condensing-tank being provided with an outlet-pipe for the escape of air that has been taken into the retort by said suction mechanism while emptying the retort of its mercury and ore, substantially as described.

6. In an apparatus for mercurializing ore, the combination of a rotatable retort to contain ore and mercury, heating mechanism for vaporizing said mercury, an adjustable pipe leading into said retort to empty the retort of its contained ore and mercury, said retort provided with an opening surrounding said adjustable pipe, a suction device connected to said adjustable pipe to draw the ore and mercury out of the retort, and a water-condensing tank provided with an agitator and with an outlet-pipe for the escape of air that has been taken into the retort by the suction device while emptying the retort of its mercury and ore, said tank also provided with an outlet-pipe to draw off the ore-pulp from the tank, and means to rotate said agitator within the tank, and thereby prevent the ore from settling in said tank, so that it may freely run out through said ore-pipe, substantially as described.

7. In an apparatus for mercurializing ores, the combination of a retort to contain ore and mercury, means for heating the mixed ore and mercury together in said retort, a suction apparatus for drawing said ore and mercury out of said retort after they have been treated together therein, and a pipe leading into the interior of said retort and communicating with said suction apparatus, the extremity of said pipe within the retort projecting at an angle to the body of the pipe and being partially rotatable, whereby it may be directed upward out of the mixed ore and mercury, and be directed downward into the combined ore and mercury at the will of the operator, substantially as set forth.

8. In an apparatus for mercurializing ores, the combination of a retort to contain ore and mercury, means for heating the mixed ore and mercury together in said retort, a suction apparatus, and a pipe $i$ having a partially-rotatable engagement with the suction apparatus and leading into the interior of said retort, said partially-rotatable pipe $i$ provided with an open end and arranged to have its open end directed upward out of the mixed ore and mercury and downward into the combined ore and mercury at the will of the operator, substantially as set forth.

In testimony whereof I sign this specification in the presence of two witnesses.

THOMAS H. HICKS.

Witnesses:
N. S. WRIGHT,
M. HICKEY.